US006420860B1

United States Patent
Yamaguchi

(10) Patent No.: US 6,420,860 B1
(45) Date of Patent: Jul. 16, 2002

(54) POWER SUPPLY SWITCHING APPARATUS FOR FACSIMILE MACHINE

(75) Inventor: Shingo Yamaguchi, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/775,043

(22) Filed: Jan. 31, 2001

(51) Int. Cl.[7] .............................. G05F 1/40; G05F 1/44; G05F 1/56
(52) U.S. Cl. ..................... 323/288; 323/282; 323/285
(58) Field of Search ................. 323/288, 282, 323/284, 285

(56) References Cited

U.S. PATENT DOCUMENTS

| | | | | |
|---|---|---|---|---|
| 4,992,923 A | * | 2/1991 | Mitsuya et al. | 363/61 |
| 5,758,040 A | | 5/1998 | Ichimura et al. | 395/113 |
| 5,834,857 A | * | 11/1998 | Abe et al. | 307/66 |
| 5,894,543 A | | 4/1999 | Yoshida et al. | 395/113 |
| 5,933,333 A | * | 8/1999 | Tsuji | 363/89 |
| 6,014,230 A | * | 1/2000 | Cheng et al. | 358/482 |
| 6,055,068 A | * | 4/2000 | Abe et al. | 358/468 |

* cited by examiner

Primary Examiner—Bao Q. Vu
(74) Attorney, Agent, or Firm—Hickman Palermo Truong & Becker LLP; Edward A. Becker; Cheryl A. Eichstaedt

(57) ABSTRACT

A power supply switching apparatus for a facsimile machine includes a power supply switch, a switch controller and a capacitor-based power supply. The power supply switch is configured to selectively couple and decouple a power supply to a facsimile machine. The switch controller is communicatively coupled to the power supply switch and is configured to control the power supply switch in response to the satisfaction of one or more switch criteria. The capacitor-based power supply is communicatively coupled to and provides power to the power supply switch, for example, when the power supply switching apparatus is operating in a standby mode, or any other time the switch controller needs power. Other embodiments include the use of a second power supply to recharge the capacitor-based switch power supply and a switch trigger instead of a switch controller.

11 Claims, 5 Drawing Sheets

POWER SUPPLY SWITCHING APPARATUS FOR FACSIMILE MACHINE

FIELD OF THE INVENTION

The invention relates to power supply mechanisms for facsimile machines, and more specifically, to a power supply apparatus for a facsimile machine.

BACKGROUND OF THE INVENTION

Most facsimile machines have two modes of operation: a main operating mode and a standby mode. In the main operating mode, power is supplied to the facsimile machine by a main power supply for performing all functions, such as transmitting facsimiles and receiving and printing facsimiles and confirmation reports. Many facsimile machines also perform other functions in the main operating mode, such as copying or scanning documents.

Most facsimile machines include a microprocessor-based controller that monitors various inputs and controls the overall operation of the facsimile machine. The controller also controls when the facsimile machine transitions between the main operating mode and the standby mode. Typically, after the facsimile machine has remained idle for a specified period of time, the controller causes the facsimile machine to transition from the main operating mode to the standby mode.

In the standby mode, the main power supply is de-energized to conserve power and to extend the life of various parts and equipment in the facsimile machine. A standby power source provides power to the controller, which must continue processing inputs and determine when to transition to the main operating mode.

Various types of standby power sources are used depending upon the requirements of a particular application. Some facsimile machines use a second, smaller power supply for standby mode that consumes less power than the main power supply. Other facsimile machines use a battery-based standby power supply. The primary disadvantages of this approach are that the batteries tend to be relatively heavy, are bulky and require a lot of space and also carry the risk that corrosive chemicals may leak from the batteries. Furthermore, both approaches require at least several watts to provide power to the microprocessor-based controllers used in most facsimile machines.

Based on the need for facsimile machines to operate in a standby mode to conserve power and the limitations in the prior approaches, a power supply apparatus for a facsimile machine that does not suffer from limitations of prior approaches is highly desirable. In particular, a power supply apparatus for a facsimile machine that provides standby power for a facsimile machine while avoiding the use of conventional batteries is desirable. A power supply apparatus for a facsimile machine that provides standby power for a facsimile machine while avoiding the use of a conventional standby controller is also desirable.

SUMMARY OF THE INVENTION

According to one aspect of the invention, a power supply switching apparatus for a facsimile machine is provided. The power supply switching apparatus comprises a power supply switch configured to selectively couple and decouple a power supply to the facsimile machine, a switch controller communicatively coupled to the power supply switch and being configured to control the power supply switch in response to the satisfaction of one or more switch criteria and a capacitor-based power supply communicatively coupled to the power supply switch and configured to provide power to the power supply switch.

According to another aspect of the invention, a power supply switching apparatus for a facsimile machine is provided. The power supply switching apparatus includes a power supply switch configured to selectively couple and decouple a power supply to a facsimile machine, a switch trigger communicatively coupled to the power supply switch and being configured to control the power supply switch in response to the satisfaction of one or more trigger criteria and a second power supply communicatively coupled to the power supply switch for providing power to the power supply switch.

According to another aspect of the invention, a facsimile machine is provided that comprises a main power supply and a capacitor-based power supply. The main power supply is configured to provide power for the facsimile machine when the facsimile machine is operating in a normal mode. The capacitor-based power supply is configured to provide power for the facsimile machine when the facsimile machine is operating in a standby mode

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Various aspects and embodiments of the invention are described in the following sections: (1) overview; (2) capacitor-based power supply; (3) switch trigger, (4) circuit examples; and (5) implementation mechanisms.

1. Overview

A power supply switching apparatus for a facsimile machine includes a power supply switch, a switch controller and a capacitor-based power supply. The power supply switch is configured to selectively couple and decouple a power supply to a facsimile machine. The switch controller is communicatively coupled to the power supply switch and is configured to control the power supply switch in response to the satisfaction of one or more switch criteria. The capacitor-based power supply is communicatively coupled to and provides power to the power supply switch, for example, when the power supply switching apparatus is operating in a standby mode, or any other time the switch controller needs power. Other embodiments include the use of a second power supply to recharge the capacitor-based switch power supply and a switch trigger instead of a switch controller.

2. Capacitor-Based Power Supply

Figure 1A:
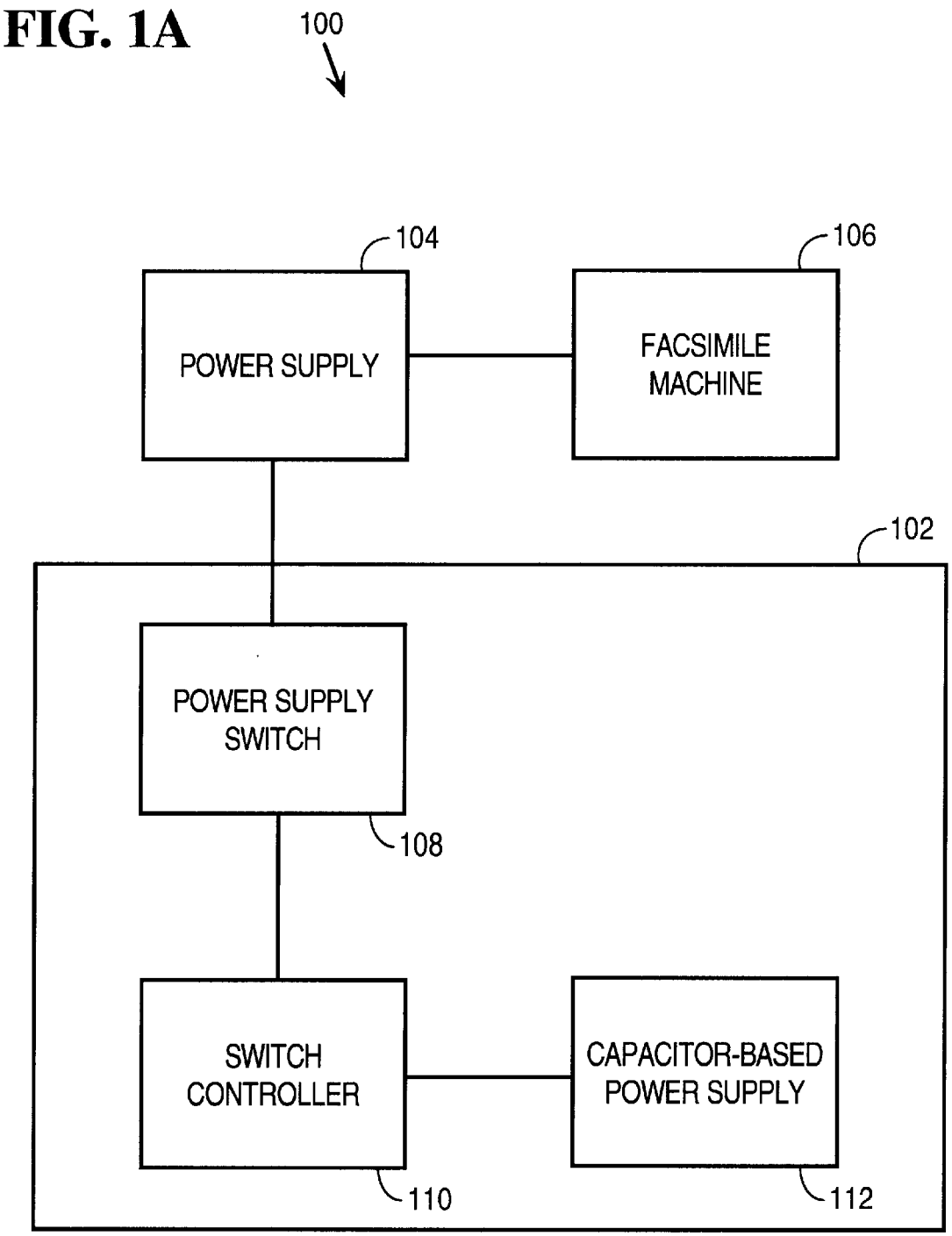
FIG. 1A is a block diagram of a power supply switching apparatus for controlling a power supply according to one embodiment of the invention.

FIG. 1A is a block diagram 100 of a power supply switching apparatus 102 for controlling a power supply 104 according to one embodiment of the invention. In this embodiment of the invention, power supply switching apparatus 102 selectively controls power supply 104 to provide or not provide power to a facsimile machine 106 that is communicatively coupled to power supply 104. Power supply 104 may be any type of mechanism for providing power to facsimile machine 106 and the invention is not limited to any particular type of power supply 104. According to one embodiment of the invention, power supply 104 is a conventional main power supply 104 for providing power to facsimile machine 106. Power supply switching apparatus 102 includes a power supply switch 108, a switch controller 110 and a capacitor-based power supply 112.

Power supply switch 108 is communicatively coupled to power supply 104 and selectively controls whether power supply 104 provides power to facsimile machine 106. For example, power supply switch 108 selectively switches power supply 104 between "ON", e.g., energized, and "OFF", e.g., non-energized, states.

Switch controller 110 is communicatively coupled to power supply switch 108 and selectively controls power supply switch 108. According to one embodiment of the invention, switch controller 110 selectively controls power supply switch 108 in response to the satisfaction of one or more switching criteria. Example switching criteria include detecting an in-coming telephone call to facsimile machine 106, detecting one or more sheets of paper being placed onto facsimile machine 106 for transmission and detecting user interaction with facsimile machine 106, such as pressing a control button. Switch controller 110 may be any type of switch controller and the invention is not limited to any particular type of switch controller. For example, switch controller 110 may be a microprocessor-based controller.

Capacitor-based power supply 112 provides backup power to switch controller 110. Switch controller 110 may ordinarily received power from power supply 104, or from another source. However, in stand-by mode, when power supply 104 is de-energized, capacitor-based power supply 112 provides power to switch controller 110. Capacitor-based power supply 112 may also provide power for power supply switch 108 in applications where power supply switch 108 requires power in a standby mode.

Capacitor-based power supply 112 may be any type of capacitor-based power supply and the invention is not limited to any particular implementation. According to one embodiment of the invention, capacitor-based power supply 112 is a set of circuit elements that includes resistors, capacitors and diodes, arranged in a configuration so that capacitor-based power supply 112 can be charged when power supply 104 is "ON" or energized. Example circuit configurations for capacitor-based power supply 112 are described and illustrated hereinafter in more detail.

The use of capacitor-based power supply 112 provides standby power to switch controller 110 without the use of conventional battery-based standby power supplies which can be are generally larger and heavier than capacitor-based power supply 112, and also pose the threat of chemical leakage. This is particularly apparent for applications where switch controller 110 is selected and/or configured to consume relatively little power.

Figure 1B:
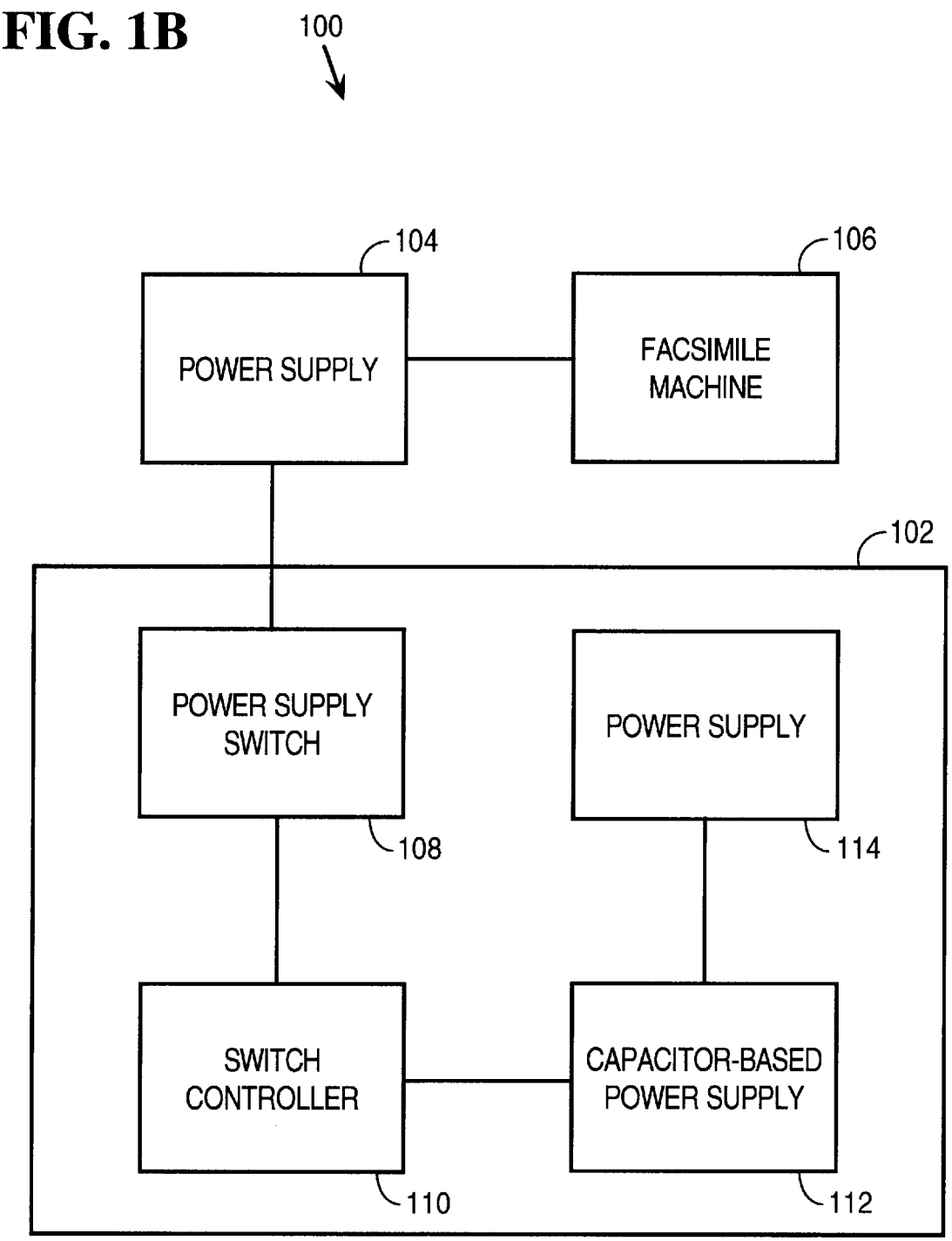
FIG. 1B is a block diagram of a power supply switching apparatus for controlling a power supply according to another embodiment of the invention.

FIG. 1B illustrates an alternative embodiment of power supply switching apparatus 102. In this embodiment, power supply switching apparatus 102 includes a power supply 114 that is communicatively coupled to capacitor-based power supply 112. Power supply 114 is configured to recharge capacitor-based power supply 112 when necessary, for example, when an available charge provided by capacitor-based power supply 112 falls below a specified charge threshold. Examples of power supply 114 include, without limitation, one or more batteries and a conventional power supply. Alternatively, power supply 114 may be used to provide power to power supply switch 108 if capacitor-based power supply 112 does not have sufficient power for power supply switch 108.

3. Switch Trigger

Figure 2:
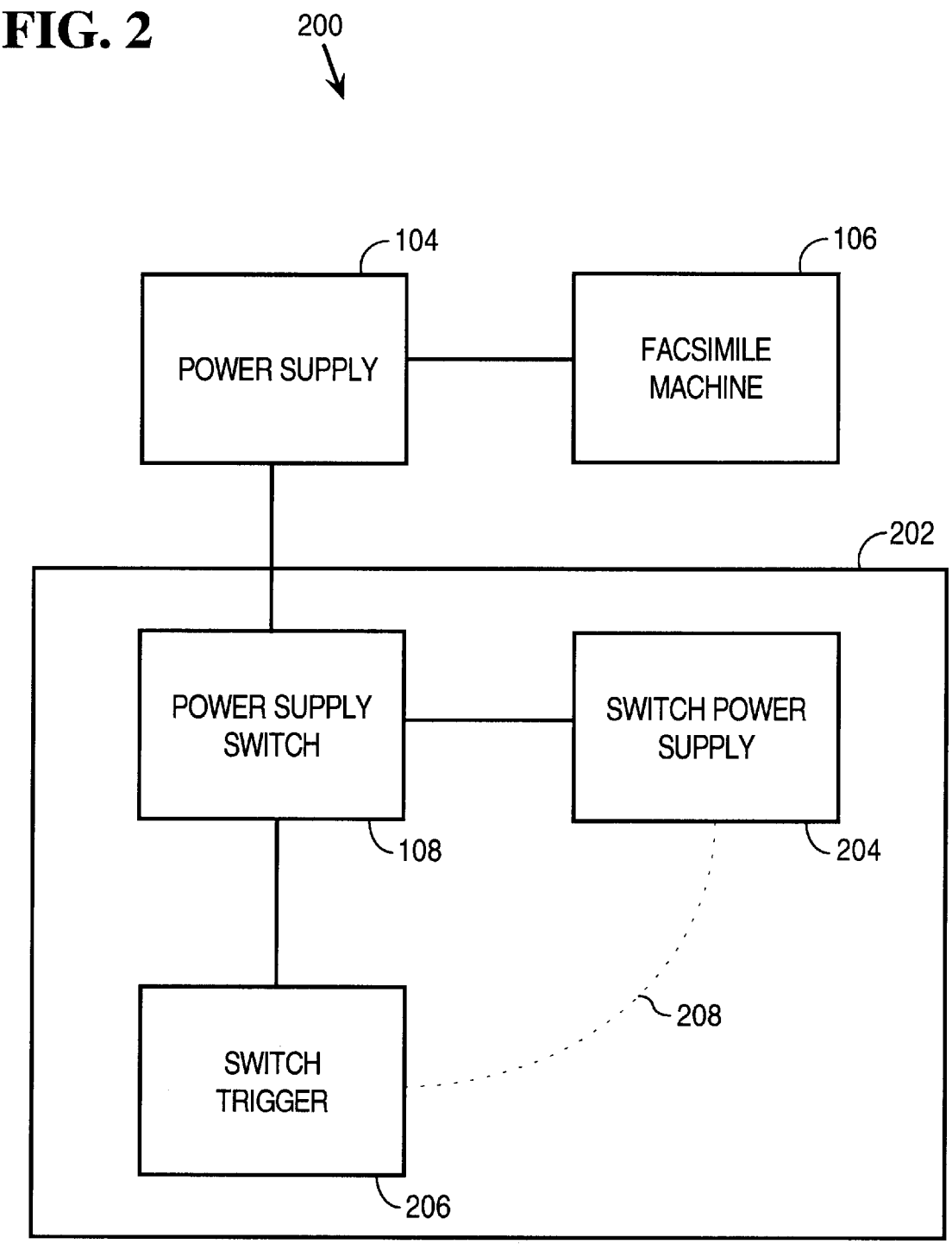
FIG. 2 is a block diagram of a power supply switching apparatus for controlling a power supply according to another embodiment of the invention.

FIG. 2 is a block diagram 100 of a power supply switching apparatus 102 for controlling a power supply 104 according to another embodiment of the invention. In this embodiment, a switch trigger 206 is used instead of switch controller 110 to selectively control power supply switch 108. In general, switch trigger 206 is a mechanism that is configured to selectively control power supply switch 108 in response to the satisfaction of one or more switching criteria, while consuming less power (if any) than a comparable switch controller 110. For example, switch trigger 206 may be embodied by a small number of discrete circuit components. Examples of switch trigger 206 are described in more detail hereinafter.

A switch power supply 204 provides power for power supply switch 108 to control power supply 104 when power supply switching apparatus 102 is operating in a standby mode and power supply switch 108 cannot get power from power supply 104 because it is off. Switch power supply 204 may also provide power to switch trigger 206, as indicated by line 208, depending upon the requirements of a particular application. Switch power supply 204 may be any type of conventional power supply. According to one embodiment of the invention, switch power supply 204 is a capacitor-based power supply as described herein.

4. Circuit Example a. Circuit Configuration

Figure 3:
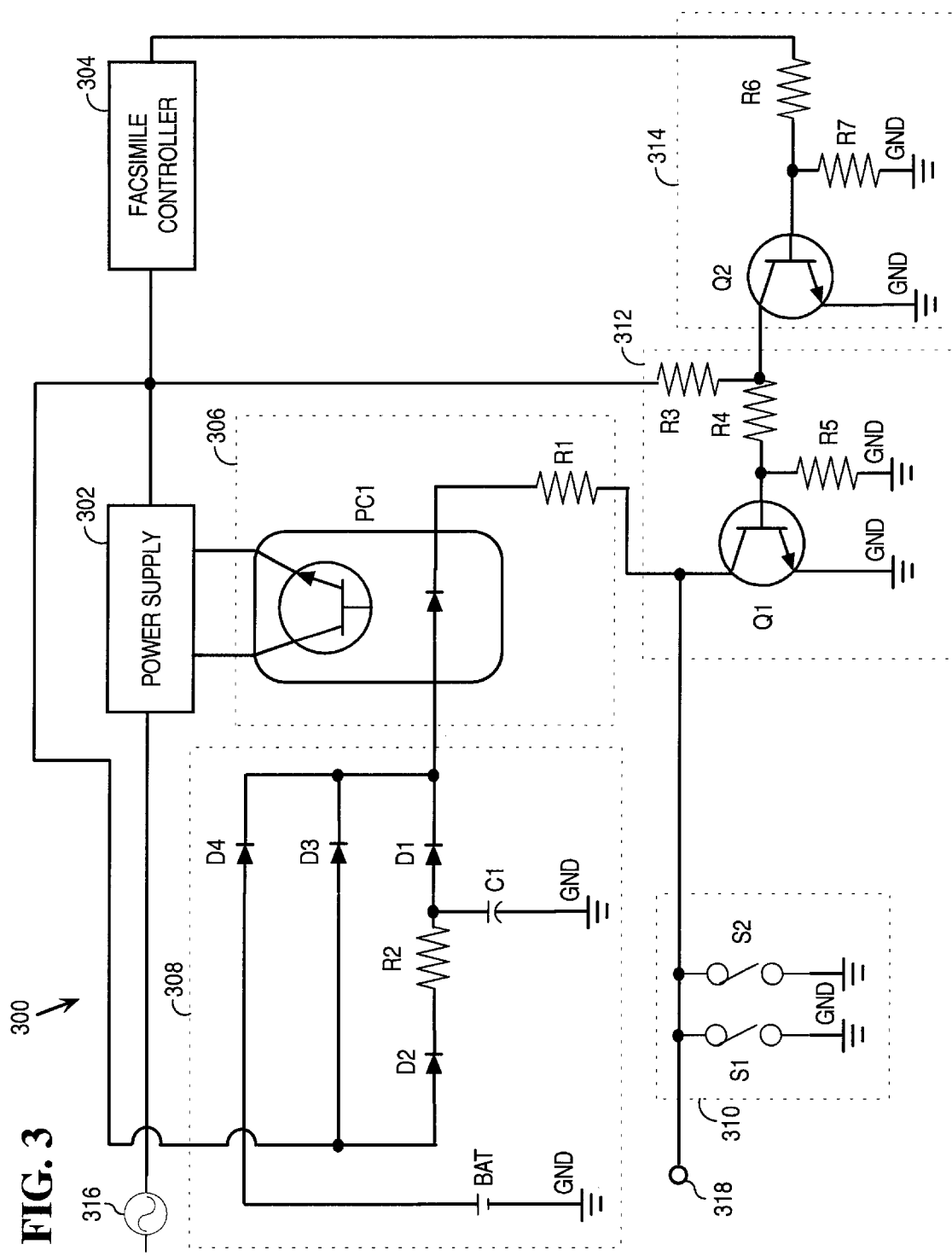
FIG. 3 is a block diagram of a power supply switching arrangement for a facsimile apparatus according to one embodiment of the invention.

FIG. 3 is a block diagram of a power supply switching arrangement 300 for a facsimile apparatus according to one embodiment of the invention. Arrangement 300 includes a power supply 302 communicatively coupled to a facsimile controller 304. Arrangement 300 includes other components that work together to perform various functions. The components are discussed hereinafter individually and also in the following groups: a power supply switch 306, a trigger power source 308, a power on trigger control 310, a power on hold control 31 and a power off trigger control 314.

Power supply switch 306 includes a photocoupler PC1 and a resistor R1. Photocoupler PC1 selectively controls whether power supply 302 provides power to a facsimile machine (not illustrated) and direct current (DC) power to facsimile controller 304. According to one embodiment of the invention, power supply 302 receives an alternating current (A/C) input 316 and provides a +5V DC output when power supply 302 is ON.

Trigger power source 308 includes diodes D1–D4, a resistor R2, a capacitor C1 and a battery BAT that provide power to power supply switch 306. Capacitor C1, diodes D1, D2 and resistor R2 together comprise a capacitor-based power supply for power supply switch 306 and also an example circuit implementation of capacitor-based power supply 112. When power supply 302 is ON, capacitor C1 is charged from the DC output of power supply 302 through diode D2 and resistor R2. When power supply 302 is turned OFF, the charge remains on capacitor C1 (subject to normal discharge), until the next power on triggering cycle. When the next power on triggering cycle occurs, the charge on capacitor C1 is discharged through the LED of photocoupler PC1, which in turn causes power supply 302 to be turned ON.

Many different types of capacitors may be used for capacitor C1 and the invention is not limited to any particular type of capacitor, the number of capacitors, or any particular capacitor configuration. Capacitors that are designed to hold a charge for a relatively long period of time increase the amount of time that the capacitor-based power supply can provide power in standby mode. One suitable type of capacitor is an electric double layer capacitor. One such capacitor is the Series SD, manufactured by the Panasonic Company. An example value for capacitor C1 is 0.1 Farads (F).

Diode D3 functions as a bypass diode when power supply 302 is turning ON to supply power to the LED of PC1.

Battery BAT and diode D4 comprise a battery backup power supply for power supply switch 306 if capacitor C1 does not have sufficient charge to activate power supply switch 306, more specifically, when the charge on capacitor C1 is insufficient to provide sufficient current to the LED in photocoupler PC1. Battery BAT and diode D4 comprise an example circuit implementation of power supply 114. A clock battery in a facsimile machine is an example implementation of battery BAT.

Power on trigger control 310 includes two switches S1 and S2, each coupled to ground GND. The closing of switch S1 or S2 is illustrative of the satisfaction of one or more trigger conditions. Example trigger conditions include, without limitation, sensing one or more sheets of paper being placed onto a facsimile machine and sensing an incoming facsimile transmission over a telephone line. Two switches S1 and S2 are depicted and described for purposes of explanation only. Any number of switches may be used depending upon the requirements of a particular application.

Figure 4:
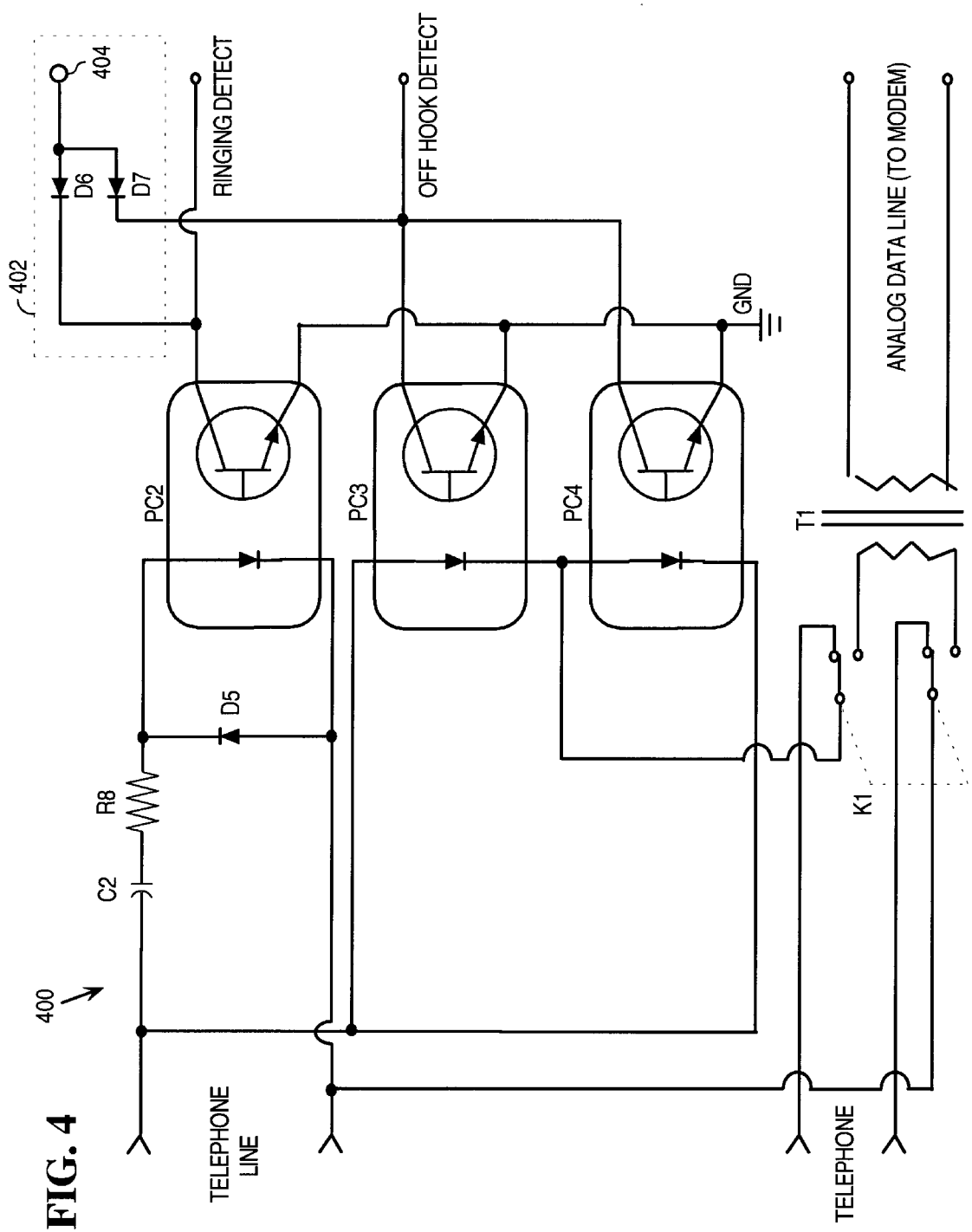
FIG. 4 is a block diagram of an arrangement that includes a power on trigger control according to another embodiment of the invention.

FIG. 4 is a block diagram of an arrangement 400 that includes a power on trigger control 402 according to another embodiment of the invention. An incoming telephone call causes photocoupler PC2 to turn ON, which in turn causes photocoupler PC2 and diode D6 to generate a power on trigger signal. If a telephone handset is lifted off the hook, then either photocoupler PC3 or PC4 turns ON, which in turn causes a power on trigger signal to be generated. A node 404 may be electrically connected to node 318 of FIG. 3.

Power on hold control 312 includes resistors R3, R4 and R5, and transistor Q1. When power supply 302 is ON, transistor Q1 is turned ON to hold power supply 302 ON, until power off trigger control 314 turns Q1 OFF. Power off trigger control 314 includes resistors R6 and R7, and transistor Q2 and is configured to generate a power off trigger signal in response to a signal from facsimile controller 304.

The specific values used for the components in arrangement 300 may vary depending upon the requirements of a particular application. An example set of component values for the components in arrangement 300 is as follows:

R1: 1K ohms
R2: 1K ohms
R3: 10K to 100K ohms
R4: 10K ohms
R5: 10K ohms
R6: 10K ohms
R7: 10K ohms
R8: 10K to 47K ohms
C1: 0.1F b. Circuit Operation With power supply 302 ON, +5V is present at the output of power supply 302, capacitor C1 is charged, transistor Q1 is ON and transistor Q2 OFF. This presumes that the power off output of facsimile controller is a logic LOW.

i. Transition From Power On to Standby Mode

At some point, facsimile controller 304 detects that switches S1 and S2 have both been open for a specified period of time. This means that the facsimile machine (not illustrated) has not been required for a specified period of time due to the absence of any trigger criteria being satisfied. Facsimile controller then sets its power off output to a logic HIGH. This causes transistor Q2 to turn ON, which in turn causes the voltage on the base input of transistor Q1 to drop below a specified threshold voltage. This causes transistor Q1 to turn OFF, which in turn causes photocoupler PC1 to turn OFF since no current can flow through the LED in photocoupler PC1 (recall that switches S1 and S2 are open). At this point, arrangement 300 is operating in a standby mode, with the capacitor-based power supply of trigger power source 308, i.e., charged capacitor C1, providing the power necessary for arrangement 300 to transition from standby mode to power on mode. Note that in this mode, power on trigger control 310 consumes no power at all, unlike conventional microprocessor-based switch controllers.

ii. Transition From Standby Mode to Power On Mode

At some point in standby mode, switch S1 or S2 closes in response to the satisfaction of one or more trigger criteria. This allows capacitor C1 to discharge through photocoupler PC1 and resistor R1, which eventually turns photocoupler PC1 ON. This, in turn, turns on power supply 302 and capacitor C1 is recharged by the +5V DC output of power supply 302. Note that in standby mode, battery BAT and diode D4 may be used to recharge capacitor C1 if the charge on capacitor C1 drops below a specified level deemed insufficient to turn ON the LED in photocoupler PC1 if either switch S1 or S2 is closed.

5. Implementation Mechanisms

The power supply switching arrangements depicted and described herein may be integrated into a facsimile mechanism, such as a facsimile machine, or may be implemented as a stand-alone mechanism. Furthermore, the arrangements may include the use of computer hardware, computer software or a combination of computer hardware and the invention is not limited to any particular implementation.

The power supply switching arrangements depicted and described herein provide numerous advantages over prior approaches. First, the use of a capacitor-based power supply to provide power to control a power supply switch provides a low cost and reliable solution that avoids the use of conventional batteries that are often large, heavy and present the risk of chemical leakage. Proper selection of the type, number and arrangement of capacitors provides sufficient power for long standby modes in facsimile applications, which increases the reliability of a facsimile machine. The benefits are further recognized by the use of a switch trigger in place of a conventional switch controller that provides additional power savings by consuming no power in a standby mode. Thus, arrangement 300 provides substantial power savings in standby mode over conventional standby arrangements that employ microprocessor-based switch controllers and allows the complete removal of conventional standby power supplies, providing a cost benefit and an increase in reliability.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A power supply switching apparatus for a facsimile machine comprising:
    a power supply switch configured to selectively couple and decouple a power supply to the facsimile machine;
    a switch controller communicatively coupled to the power supply switch and being configured to control the power supply switch in response to the satisfaction of one or more switch criteria; and
    a capacitor-based power supply comprising an electric double layer capacitor and being communicatively coupled to the power supply switch and configured to provide power to the power supply switch.

2. A power supply switching apparatus for a facsimile machine comprising:
    a power supply switch configured to selectively couple and decouple a power supply to the facsimile machine;
    a switch controller communicatively coupled to the power supply switch and being configured to control the power supply switch in response to the satisfaction of one or more switch criteria;
    a capacitor-based power supply communicatively coupled to the power supply switch and configured to provide power to the power supply switch,
    the capacitor-based power supply comprising
        a capacitor electrically connected between ground and a first node,
        a first diode electrically connected between the first node and a second node, and
        second diode and a resistor electrically connected in series between the first node and a third node.

3. The apparatus as recited in claim 2, further comprising a second power supply communicatively coupled to the capacitor-based power supply configured to charge the capacitor-based power supply if a charge of the capacitor-based power supply satisfies specified charge criteria.

4. The apparatus as recited in claim 2, wherein the one or more switching criteria include whether a facsimile is ready to be received and whether the facsimile is ready to be transmitted.

5. The apparatus as recited in claim 2, wherein the switch controller is a trigger circuit.

6. A power supply switching apparatus for a facsimile machine comprising:
    a power supply switch configured to selectively couple and decouple a power supply to a facsimile machine;
    a switch trigger communicatively coupled to the power supply switch and being configured to control the power supply switch in response to the satisfaction of one or more trigger criteria; and
    second power supply communicatively coupled to the power supply switch for providing power to the power supply switch,
    the second power supply comprising
        a capacitor electrically connected between ground and a first node,
        a first diode electrically connected between the first node and a second node, and
        a second diode and a resistor electrically connected in series between the first node and a third node.

7. A facsimile machine comprising:
    a main power supply configured to provide power for the facsimile machine when the facsimile machine is operating in a normal mode; and
    a capacitor-based power supply configured to provide power for the facsimile machine when the facsimile machine is operating in a standby mode, the capacitor-based power supply comprising
        a capacitor electrically connected between ground and a first node,
        a first diode electrically connected between the first node and a second node, and
        a second diode and a resistor electrically connected in series between the first node and a third node.

8. The apparatus as recited in claim 7, further comprising a second power supply communicatively coupled to the capacitor-based power supply configured to charge the capacitor-based power supply if a charge of the capacitor-based power supply satisfies specified charge criteria.

9. The apparatus as recited in claim 1, further comprising a second power supply communicatively coupled to the capacitor-based power supply configured to charge the capacitor-based power supply if a charge of the capacitor-based power supply satisfies specified charge criteria.

10. The apparatus as recited in claim 1, wherein the one or more switching criteria include whether a facsimile is ready to be received and whether the facsimile is ready to be transmitted.

11. The apparatus as recited in claim 1, wherein the switch controller is a trigger circuit.

* * * * *